United States Patent [19]

Yasuda et al.

[11] Patent Number: 5,040,661
[45] Date of Patent: Aug. 20, 1991

[54] CONTAINER TRANSPORT METHOD AND DEVICE

[75] Inventors: Hidehiro Yasuda; Tatsuya Fukumoto, both of Ayabe; Takehiro Abe, Moriyama; Masayuki Funaoka, Ayabe, all of Japan

[73] Assignee: Gunze Limited, Ayabe, Japan

[21] Appl. No.: 499,734

[22] Filed: Mar. 26, 1990

[30] Foreign Application Priority Data

Mar. 29, 1989 [JP] Japan .................................. 1-79070

[51] Int. Cl.$^5$ ............................................ B65G 43/08
[52] U.S. Cl. .................................... 198/395; 198/379
[58] Field of Search ............ 198/379, 394, 395, 463.1, 198/345.1

[56] References Cited

U.S. PATENT DOCUMENTS

| 2,577,341 | 12/1951 | Magnusson | 198/379 |
| 2,681,758 | 6/1954 | Lipson | 198/345.1 X |
| 3,690,456 | 9/1972 | Powers | 198/379 X |
| 3,957,154 | 5/1976 | Shiba | 198/394 |
| 4,252,230 | 2/1981 | Eriksson | 198/379 X |
| 4,789,016 | 12/1988 | Mihail | 198/463.4 X |

FOREIGN PATENT DOCUMENTS

| 63-29 | 1/1988 | Japan . |
| 63-96014 | 4/1988 | Japan . |
| 1-70331 | 3/1989 | Japan . |

Primary Examiner—Robert P. Olszewski
Assistant Examiner—Keith L. Dixon
Attorney, Agent, or Firm—Armstrong, Nikaido, Marmelstein, Kubovcik & Murray

[57] ABSTRACT

A container transport method for turning a container to a specified direction and transporting the container to a position for specified processing, includes a first step of transporting one of supplied containers to a first position, the one being a container leading rest of the containers; a second step of turning the container at the first position to a specified direction; and a third step of transporting the container turned to the specified direction to a second position so that the container be directed in a certain relationship with the specified direction at the second position. A container transport device for turning a container to a specified direction and transporting the container to a position for specified processing includes a first transport device for transporting one of supplied containers to a first position, the one being a container leading rest of the containers; a detecting device for detecting an actual direction of the container; a rotating device for turning the container to a specified direction at the first position; and a second transport device for transporting the container from the first position to a second position for specified processing so that the container be directed in a certain relationship with the specified direction at the second position.

13 Claims, 7 Drawing Sheets

CONTAINER TRANSPORT METHOD AND DEVICE

BACKGROUND OF THE INVENTION (1) Field of the Invention

This invention relates to container transport method and device for transporting a container to, for example, a label mounting position of an apparatus for mounting a label on the container.

(2) Description of the Prior Art

For a label mounting apparatus, container transport is done to put a container at a label mounting position. Conventionally, the container is transported by a belt conveyor or the like carrying the container thereon.

Recently, containers have been shaped in various ways and especially, those comprising a portion (a mark, shape or the like) indicating in which way it is directed have been replacing those comprising a simple body of rotation or a pattern repetition not indicating which way the container is directed. For mounting a label on such new types of containers, it is necessary to keep a position of the above portion on the container and a portion thereof for the label in a certain relationship.

The above conventional method, by which the containers are not necessarily transported while being kept in a certain direction, has the problem that it is hard to fulfill the above requirement.

SUMMARY OF THE INVENTION

Accordingly, a first object of the present invention is to offer a container transport method and device for transporting containers while directing them as specified.

The above object is fulfilled by a container transport method for turning a container to a specified direction and transporting the container to a position for specified processing, the method comprising a first step of transporting one of supplied containers to a first position, the one being a container leading the rest of the containers. In a second step, the container is turned at the first position to a specified direction. In a third step, the container turned to the specified direction is transported to a second position so that the container be directed in a certain relationship with the specified direction at the second position. The above method will be referred to as method [A].

The above object is also fulfilled by a container transport method for transporting an unprocessed container having a pattern thereon while temporarily stopping the container at a processing position on a transport path, the pattern being directed as specified at the processing position, the method comprising the steps of widening a distance between one of unprocessed containers and rest thereof, the above one being a container leading the rest on a transporting path. The leading container is then transported downstream a certain distance in a transporting direction. The leading container is rotated to turn a pattern thereon to a specified direction. The leading container further downstream to a processing position while maintaining the direction of the container. The leading container is temporarily stopped at the processing position.

The above object is also fulfilled by a container transport device for turning a container to a specified direction and transporting the container to a position for specified processing, the device comprising a first transport device for transporting one of many supplied containers to a first position, the one being a container leading the rest of the containers. A detecting device detects an actual direction of the container. A rotating device turns the container to a specified direction at the first position. A second transport device transports the container from the first position to a second position for specified processing so that the container be directed in a certain relationship with the specified direction at the second position. The above device will be referred to as device [B].

The above object is also fulfilled by a container transport device for transporting an unprocessed container having a pattern thereon while temporarily stopping the container at a processing position on a transport path, the pattern being directed as specified at the processing position, the device comprising a transport device for transporting unprocessed containers. A widening device widens a distance between one of the containers and the rest thereof, the above one being a container leading the rest on a transporting path. A first carrying device transports while holding the leading container downstream a certain distance in a transporting direction. A direction adjusting device rotates the leading container to turn a mark of a pattern thereon to a specified direction. A second carrying device transports while holding the leading container still downstream in the transporting direction to a processing position while keeping the direction of the container. A stopping device temporarily stops the container at the processing position. The device will be referred to as device [C].

According to the above, a container is turned to a specified direction before being transported to a position for specified processing. Therefore, the processing can be done with consideration of the direction of the container. In a label mounting apparatus, for example, a label can be mounted with consideration of the position of a pattern or the like on the container.

A second object of the present invention is to offer a container transport method and device for directing the containers uniformly without slowing down the transport.

The above object is fulfilled by the container transport method [A], wherein when the container is at the first position, another container is at a fourth position; and the container at the first position is transported to the second one while the container at the fourth position is transported to the first one.

The above object is also fulfilled by the container transport device [B], wherein holding members of the second transport means each have a holding portion for, while the container is held by the holding members, holding another container at the fourth position.

The above objects are also fulfilled by the container transport device [B], wherein the rotating device is at a retracting position for allowing the container to be transported when the holding members are moving downstream and is at a contacting position for contacting the container to rotate the container when the holding members are moving upstream.

The above object is also fulfilled by the container transport device [C], wherein the two carrying device are integrated into one having two holding portions respectively provided at an upstream position and a downstream position in the transporting direction, the holding portions transporting while holding two containers by one operation.

In the above, while a container is transported to a position for direction adjustment, another container is transported to another position for specified processing. Accordingly, the practical operating speed is increased. Since the direction adjustment and the specified processing are done simultaneously, the operating speed is still increased. Moreover, while the container is turned to the specified direction, the holding members movable upstream and downstream is moved downstream. This reduces wasted time, whereby the operating speed of the apparatus is increased. The construction, wherein two carrying device are integrated into one, simplifies mechanisms for supporting and driving them.

A third object of this invention is to offer a container transport method and device requiring less space.

The above object is fulfilled by the container transport method [A], wherein the container is transported in substantially the same direction as supplied, in the first and the third steps.

In the above, the transporting direction to the first and second positions is the same as the supplying direction. Therefore, the apparatus requires less space in the vertical direction to the transporting one.

BRIEF DESCRIPTION OF THE DRAWINGS

These and other objects, advantages and features of the invention will become apparent from the following description thereof taken in conjunction with the accompanying drawings which illustrate the specific embodiment of the invention. In the drawings.

DESCRIPTION OF A PREFERRED EMBODIMENT

An embodiment according to this invention applied to a label mounting apparatus will be described hereinafter.

Figure 1:
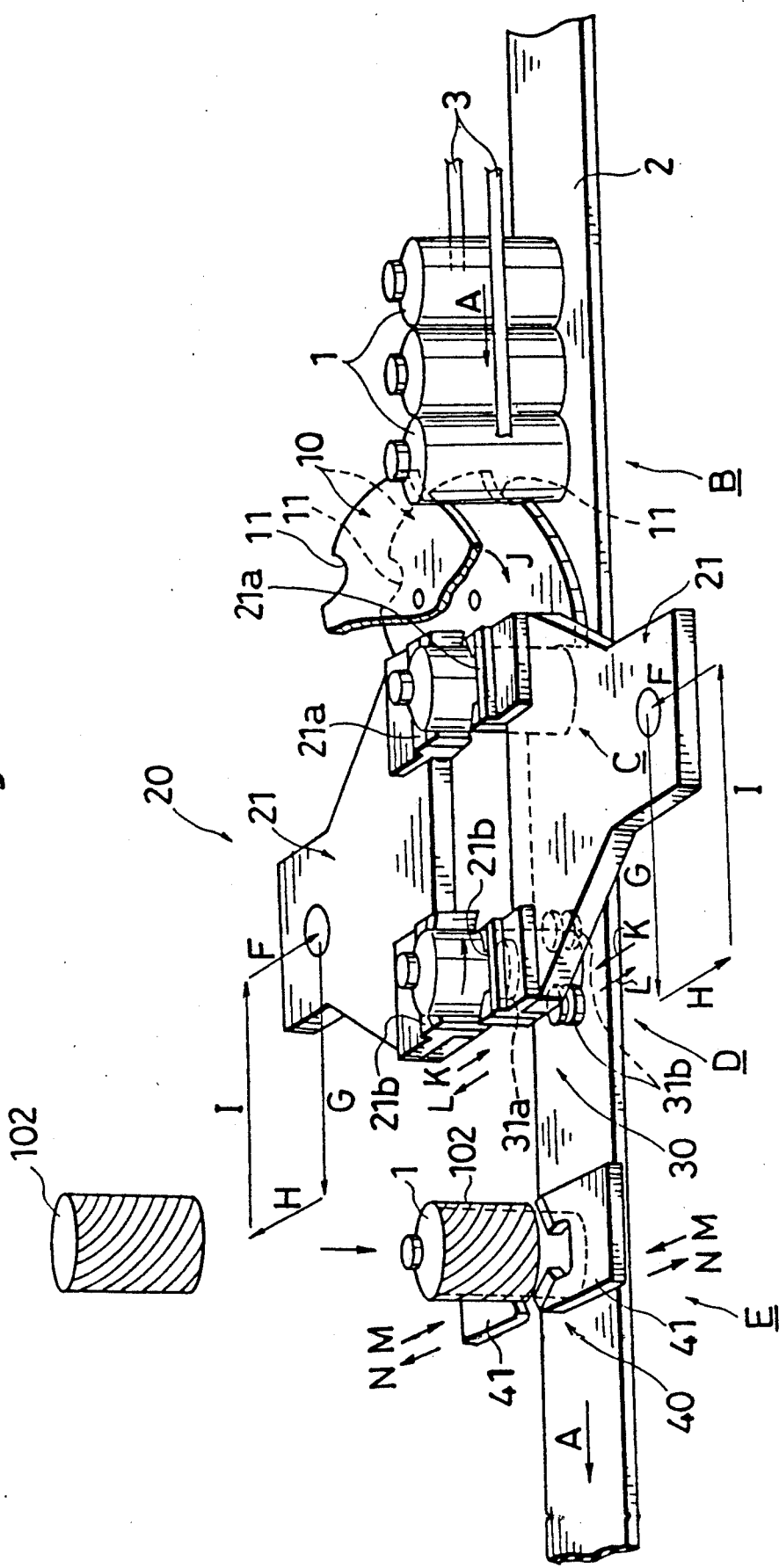
FIG. 1 is a perspective view of a label mounting apparatus employing a container transport device according to this invention.

In FIG. 1, the label mounting apparatus comprises a belt conveyor 2, a pair of star wheels 10, a carrying device 20, a direction adjuster 30, a stopper 40, and a known label mounting device (not shown here but disclosed in, for example, Japanese Patent Publication Kokai Nos. 63-29 and 63-96014).

The belt conveyor 2 is for transporting substantially cylindrical containers 1 such as a bottle from an upstream end (right in FIG. 1) of the apparatus in a direction of an arrow A while a pair of guides 3 protects the containers 1 from dropping off the belt conveyor 2. The star wheels 10 are for taking out one of the containers 1 which has reached a taking-out position B and sending it to an intermediate position C. The carrying device 20 is for carrying the container 1 from the intermediate position C to a direction adjusting position D and further to a label mounting position E. The direction adjuster 30 is for rotating the container 1 at the direction adjusting position D until the container 1 is turned to a specified direction. The stopper 40 is for stopping the container 1 at the label mounting position E temporarily. The label mounting device is for mounting a cylindrical label 102 around the container 1 at the label mounting position E. In the above construction, the intermediate position C and the label mounting position E are equally distanced from the direction adjusting position D.

Figure 2:
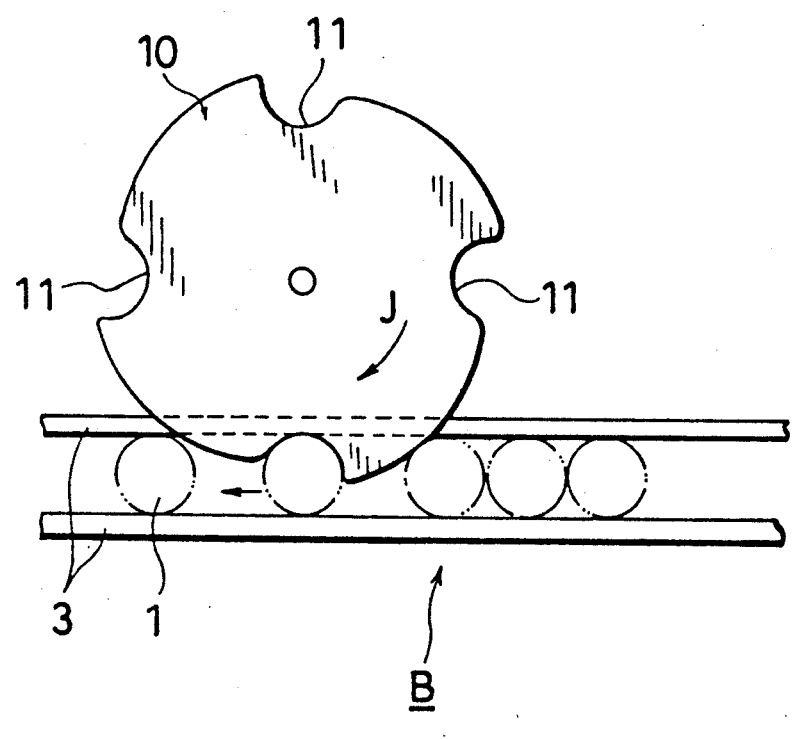
FIG. 2 is a plane view of a star wheel of the same.

As shown in FIG. 2, each star wheel 10 is a disc having four concaves 11 around its periphery. The star wheels 10 are to be driven by a driving motor M1 through a rotating shaft 22, a gearing mechanism 22e and a driving shaft 12 (FIG. 3) to rotate in a direction of an arrow J. By this mechanism, the star wheels 10 take out the container 1 at the taking-out position B with one of the concaves 11 and send it to the intermediate position C.

The carrying device 20 (FIG. 1) comprises a pair of carrying members 21 each having holding portions 21a and 21b attached on a mounting base 21c. The carrying members 21 are to move substantially in directions of arrows F, G, H, and I in series while holding the container 1 with the holding portions 21a, whereby carrying the container 1 from the intermediate position C to the direction adjusting position D. The carrying members 21 are to further carry the container 1 to the label mounting position E by holding it with the holding portions 21b. A distance between the holding portions 21a and 21b of each carrying member 21 is the same as that between the intermediate position C and the direction adjusting position D and also is the same as that between the direction adjusting position D and the label mounting position E.

The carrying device 20 is further equipped with a supporting mechanism for supporting the carrying members 21 in a manner that the members 21 are movable in the F, G, H, and I directions, and also with a driving mechanism for moving the carrying members 21.

Figure 4:
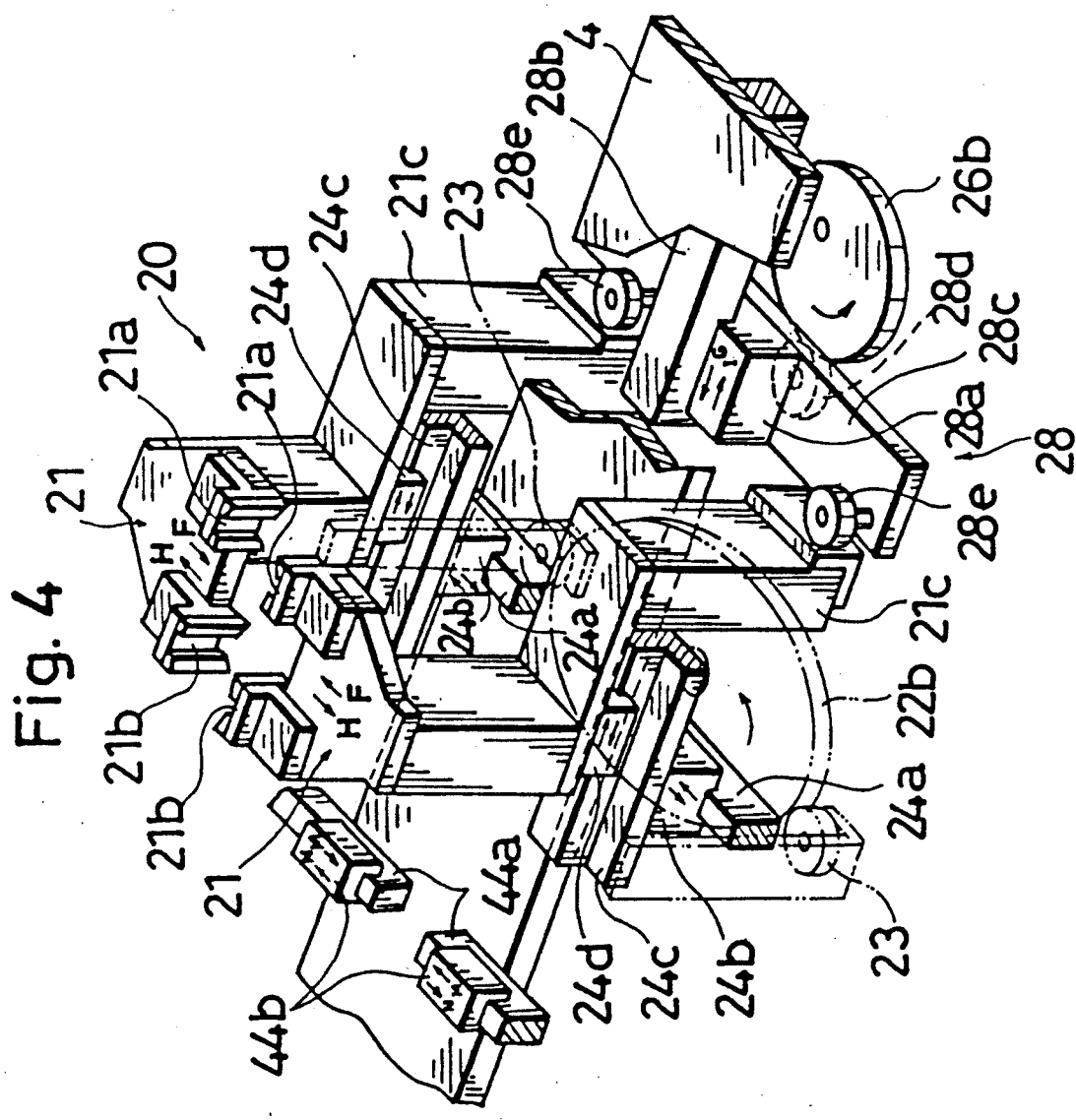
FIG. 4 is a perspective view of a carrying device of the same.

As shown in FIG. 4, the supporting mechanism comprises a frame 4, a pair of guides 24a, a pair of sliders 24b, and another pair of guides 24c and another pair of sliders 24d. The carrying members 21 are supported by the frame 4 through the guides 24a and 24c and the sliders 24b and 24d. The carrying members 21 are moved in the F and H directions when the sliders 24b are slided along the guides 24a and in the G and I directions when the sliders 24d are slided along the guides 24c.

The driving mechanism for driving the carrying members 21 in the F and H directions comprises a spring 27a (FIG. 3) extended between the members 21 for energizing the members 21 as shown with F (for approaching the members 21 to each other), a pair of subordinate rollers 23 each attached to the guide 24c, and a cam wheel 22b attached to the rotating shaft 22 for driving the members 21 as shown with H (for separating the members 21 from each other) by contacting the subordinate rollers 23. The cam wheel 22b is shaped and phased so that each semi-rotation thereof may cause one stroke of the members 21. Thanks to such shape and phase, only one cam wheel is enough to drive both of the members 21 in the F and H directions. Needless to say, however, another construction employing multiple cam wheels is usable.

The driving mechanism for driving the members 21 in the G and I directions comprises another spring (not shown) extended between the members 21 and the frame 4 for energizing the members 21 as shown with I, a cam wheel 26b, and a driving force conveying device 28 for conveying a driving force of the cam wheel 26b to the members 21. The driving force conveying device 28 comprises a slider 28a, a guide 28b attached to the frame 4 for guiding the slider 28a to move in the G and I directions, a moving plate 28c attached to the slider 28a, a subordinate roller 28d attached to the moving plate 28c and contacted to the cam wheel 26b, and a pair of free rollers 28e each contacted to the mounting base 21c. Since the driving force of the cam wheel 26b is conveyed to the members 21 through the free rollers 28e in this construction, the conveyance is surely done without disturbing smooth movement of the members 21 in the F and H directions no matter where the members 21 are in those directions.

Figure 3:
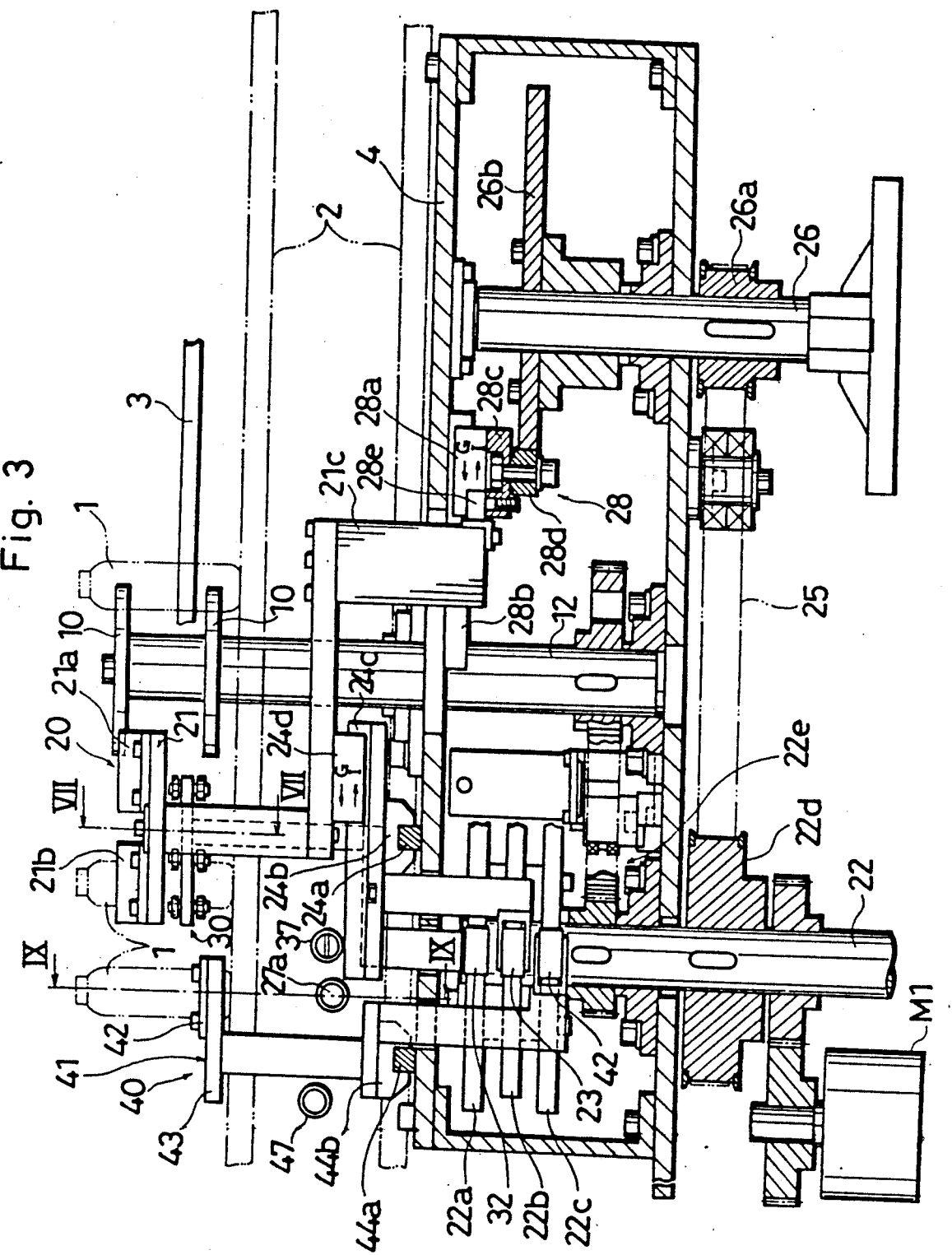
FIG. 3 is a cross sectional view of the apparatus.

As shown in FIG. 3, the cam wheel 26b is to rotate by the driving force of the driving motor M1 through a large pulley 22d, a belt 25, a small pulley 26a and the driving shaft 26. The radiuses of the large pulley 22d and the small pulley 26a are set 2:1. The cam wheel 26b is shaped and phased so that the members 21 each make one stroke by each rotation of the cam wheel 26b, namely, by each semi-rotation of the rotating shaft 22 equipped with the cam wheel 22b. Such a construction keeps a pressure angle of the cam wheel 26b small even if the members 21 are to make a long stroke. Another construction is, of course, usable. Phases of the cam wheels 22b and 26b are deflected by 90° so that the members 21 may move substantially in the F, G, H and I directions in series.

Figure 5:
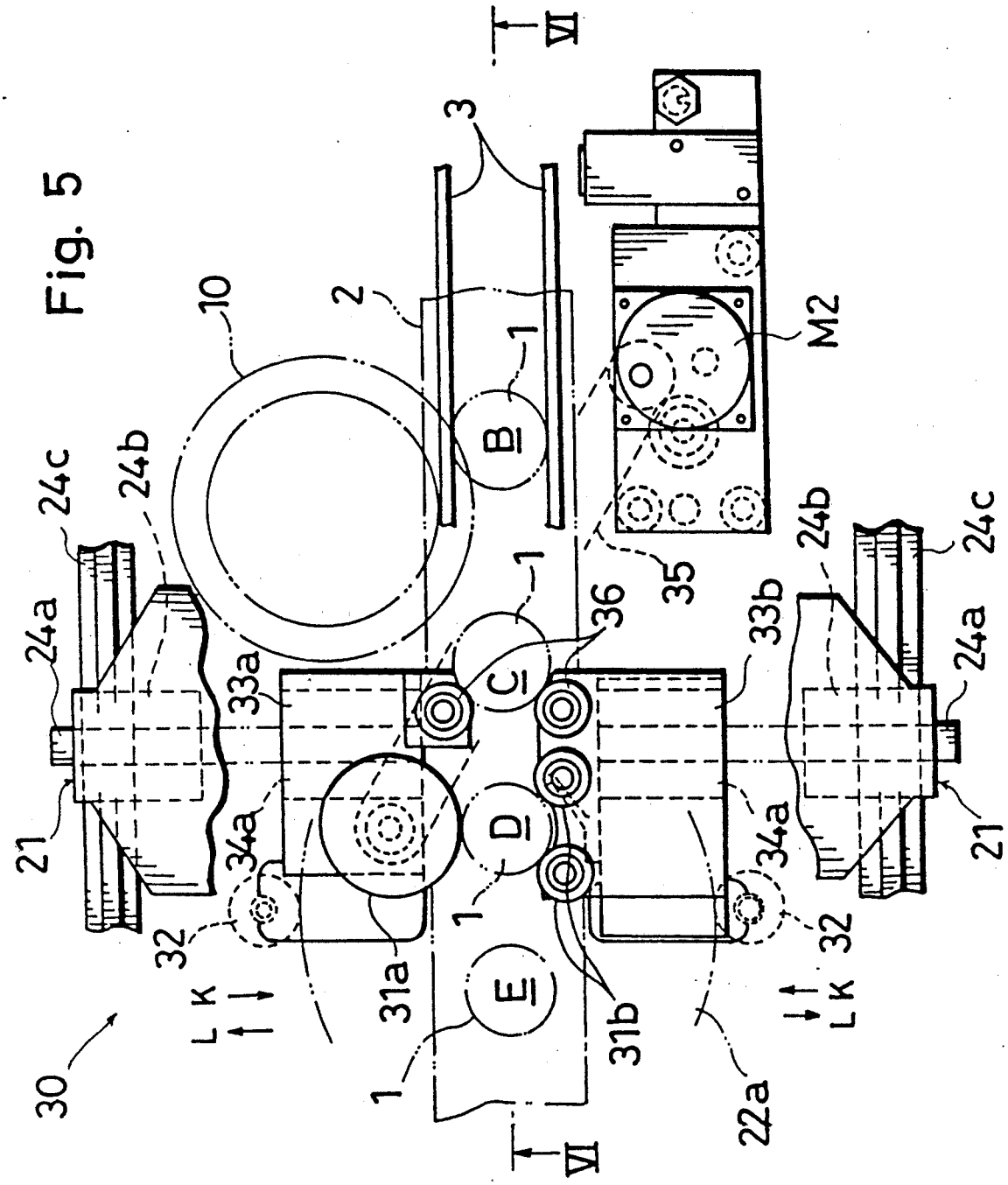
FIG. 5 is a plane view of a direction adjuster of the same.
Figure 6:
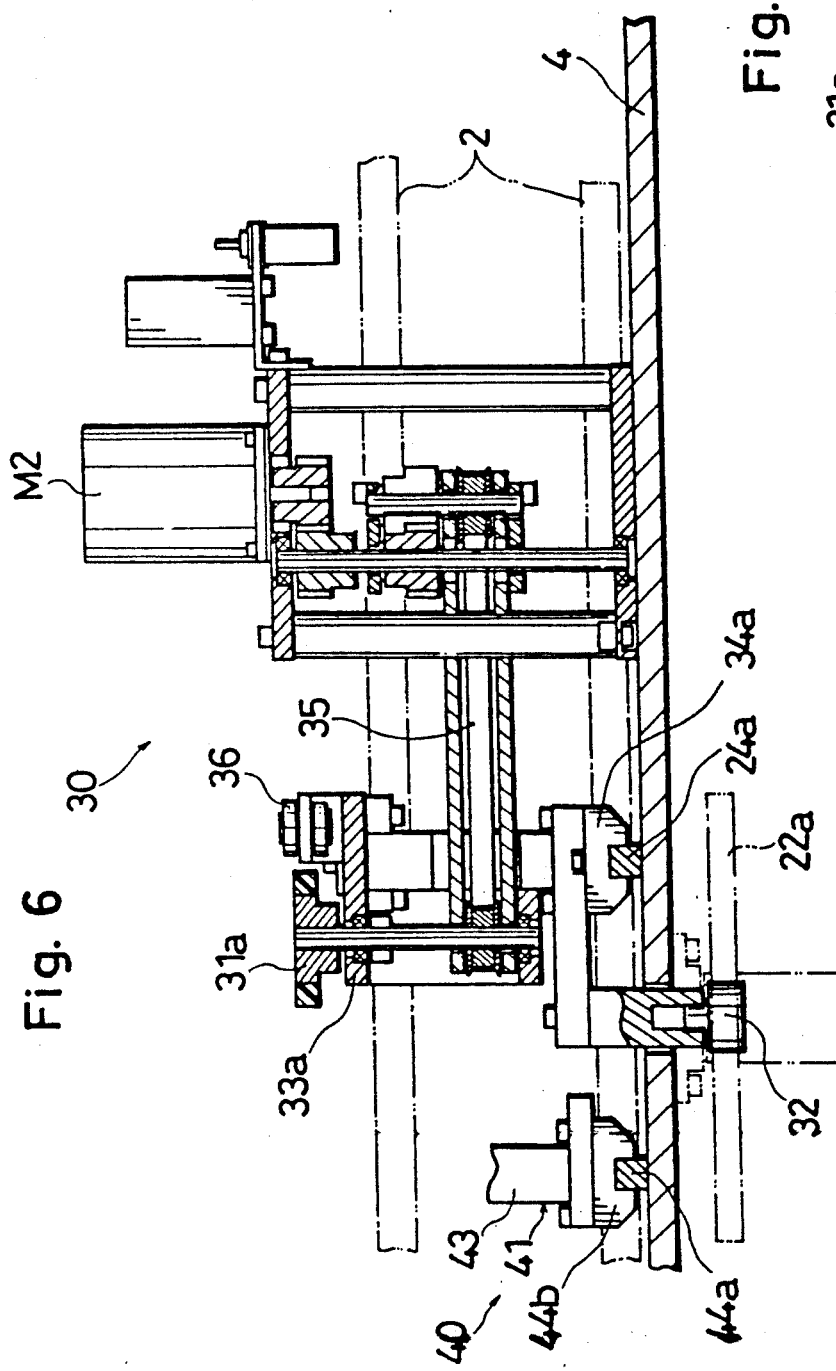
FIG. 6 is a cross sectional view taken along lines VI—VI of FIG. 5.

As shown in FIGS. 5 and 6, the direction adjuster 30 comprises a mounting base 33a equipped with a driving roller 31a for rotating the container 1 and another mounting base 33b equipped with a pair of free rollers 31b. The driving roller 31a is to rotate by receiving a driving force of a driving motor M2 through a belt 35. The driving motor M2 may be attached to the mounting base 33a instead of the frame 4 as above. The mounting bases 33a and 33b are equipped with a pair of rollers 36 for putting the container 1 taken out by the star wheels 10 precisely at the intermediate position C.

The direction adjuster 30 further comprises a detector provided upstream from the driving roller 31a for detecting to which direction the container 1 is turned and a control unit. (Neither the detector nor the control unit is shown.) The detector may optically detect that a mark on the container 1 is turned to the specified direction or may mechanically detect a position of a projection or the like formed on the container 1. Or, the detector may detect a position of a pattern formed on the container 1 by processing an image signal obtained by image sensors or the like. The control unit is to control rotation of the driving motor M2 based on a signal from the detector and stop its rotation when the container 1 is turned to the specified direction. The detector may detect how much the actual direction of the container 1 is deflected from a specified one, in which case the motor M2 may be controlled to rotate the container 1 by that amount.

The mounting bases 33a and 33b are attached to a pair of sliders 34a. The sliders 34a are supported between the sliders 24b by the guides 24a in a manner that the sliders 34a are movable in directions of arrows K and L. The mounting bases 33a and 33b are equipped with a spring 37 (FIG. 3) extended therebetween for energizing the bases 33a and 33b as shown with K (for approaching the bases 33a and 33b to each other) and a pair of subordinate rollers 32. The subordinate rollers 32 are to contact a cam wheel 22a attached to the rotating shaft 22 for driving the mounting bases 33a and 33b as shown with L (for separating the bases 33a and 33b from each other). The cam wheel 22a is shaped and phased so that each semi-rotation thereof causes the bases 33a and 33b to make one stroke substantially oppositely to the members 21. The driving roller 31a and the free rollers 31b are to be in contact with the container 1 at least until the container 1 is rotated to be turned to the specified direction.

Figure 7:
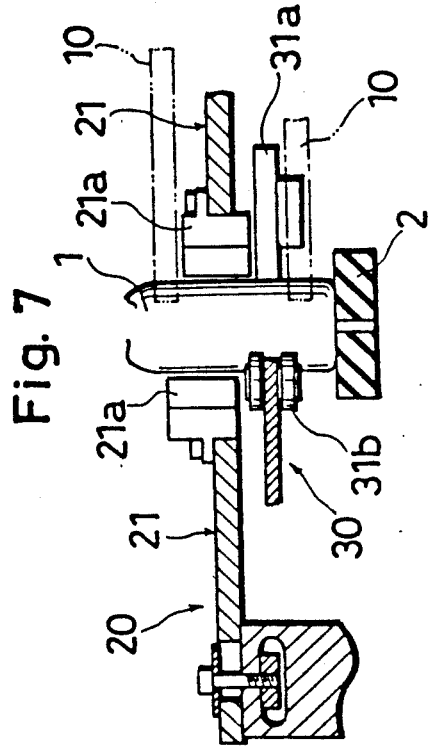
FIG. 7 is a cross sectional view taken along lines VII—VII of FIG. 3.

As shown in FIG. 7, vertical positions of the star wheels 10, the holding portions 21a of the carrying members 21, the driving roller 31a and the free rollers 31b are controlled so that they avoid interfering one another.

Figure 8:
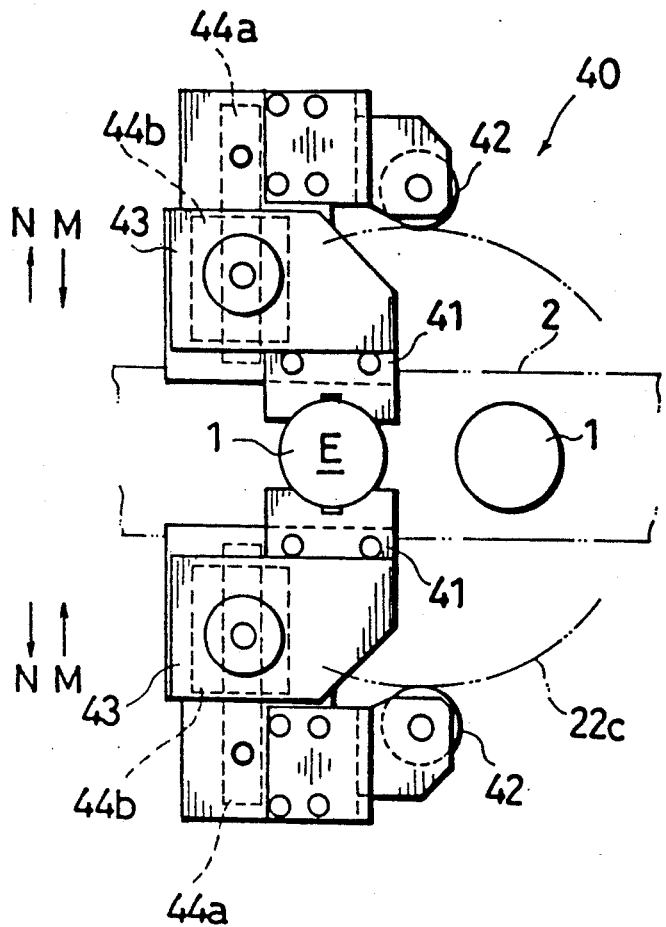
FIG. 8 is a plane view of a stopper of the apparatus.
Figure 9:
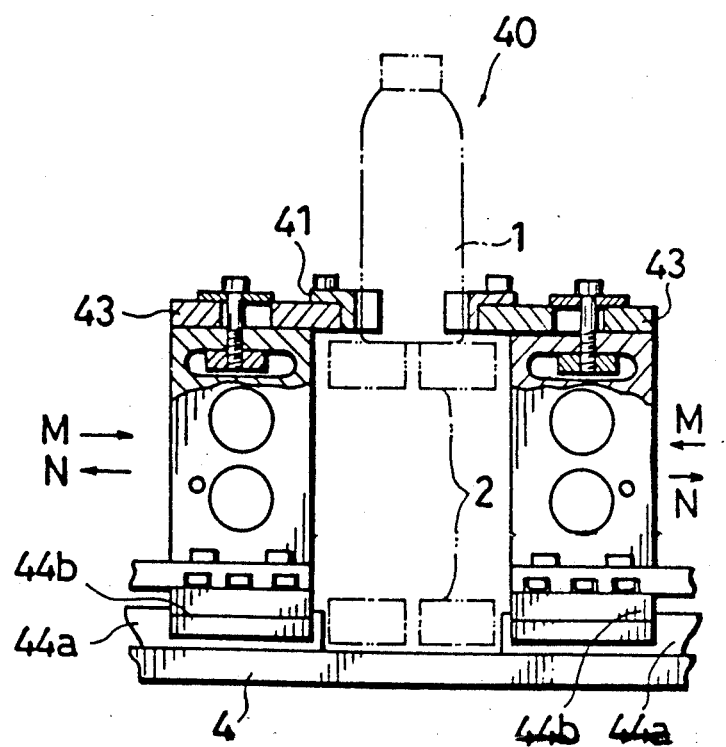
FIG. 9 is a cross sectional view taken along lines IX—IX of FIG. 3.

As shown in FIGS. 8 and 9, the stopper 40 comprises a pair of mounting bases 43 each having a holding member 41. The mounting bases 43 are respectively attached to a pair of sliders 44b, which are guided by a pair of guides 44a attached to the frame 4. The bases 43 are movable in directions of arrows M and N when the sliders 44b are slided along the guides 44a.

The bases 43 are further equipped with a spring 47 (FIG. 3) extended therebetween for energizing the bases 43 as shown with M (for approaching the bases 43 to each other) and a pair of subordinate rollers 42. The subordinate rollers 42 are to contact a cam wheel 22c attached to the rotating shaft 22 for driving the bases 43 as shown with N (for separating the bases 43 from each other).

The cam wheel 22c is shaped and phased so that each semi-rotation thereof causes the bases 43 to make one stroke substantially oppositely to the bases 33a and 33b. The holding members 41 holds the container 1 at least until mounting of the label 102 is finished.

A method of transporting the container 1 in the above label mounting apparatus will be described below.

The container 1 is formed by a forming device (not shown) and transported by the belt conveyor 2 from the upstream end of the apparatus to the taking-out position B.

Then, the container 1 is taken out by the star wheels 10 with one of the concaves 11 and is carried to the intermediate position C at a higher speed than a moving speed of the belt conveyor 2. Even if the multiple containers 1 are transported one after another with small pitches from the upstream end of the apparatus, the star wheels 10 widens a distance between a preceding container and following containers and surely carries all the containers one by one. Since the container 1 is located by the rollers 36 at the intermediate position C, the star wheels 10 may only take out the container 1 and let the belt conveyor 2 carry it to the intermediate position C.

The container 1 which has reached the intermediate position C is held by the holding portions 21a of the carrying members 21 moving as shown with F and then carried to the direction adjusting position D by the members 21 moving the G direction.

At the position D, the container 1 is released from the holding portions 21a of the members 21 moving as shown with H but is held by the driving rollers 31a and the free rollers 31b of the direction adjuster 30 moving as shown with K.

The direction adjuster 30 is driven by the driving motor M2 to rotate the container 1 until the detector detects, for example, that a mark on the container 1 is turned to the specified direction. After the container 1 is turned to the specified direction in this way, the rollers 31a and 31b are moved as shown with L to release the container 1.

The carrying members 21, after releasing the container 1, are moved in the I direction to their original positions. Synchronously with the above release by the rollers 31a and 31b, the members 21 are again moved as shown with F to hold the container 1 with the holding portions 21b. The members 21 are further moved in the G direction to carry the container 1 to the label mounting position E without changing the direction of the container 1.

At the label mounting position E, the container 1 is released from the holding portions 21b of the members 21 moving as shown with H but is held by the holding members 41 moving as shown with M.

After that, the label mounting device mounts the label 102 having specified height and diameter around the container 1 from above. Thanks to the direction adjustment done at the direction adjusting position D, the label 102 is mounted precisely as desired only if the label 102 is directed in correspondence with the direction of the container 1.

The container 1 with the label 102 is released from the holding members 41 moving as shown with N and is transported in the A direction by the belt conveyor 2. After that, the container 1 is sent to, for example, a heat-shrinking device, which pressure-adheres the label 102 around the container 1 utilizing that the label 102 is shrunk by heat.

Synchronously with the movement of the container 1 to the label mounting position E by the holding portions 21b, another container 1 is carried from the intermediate position C to the direction adjusting position D by the holding portions 21a of the carrying members 21. The same operation is repeated thereafter.

In the above embodiment, the movements of the star wheels 10, the carrying members 21, the mounting bases 33a and 33b, and the holding members 41 are all driven by only one driving motor M1 through the cam wheels 22a through 22c, the gearing mechanism 22e, the pulley 22d and the like. Therefore, the above movements are timed appropriately. Another construction, wherein each movement is driven by an independent actuator such as a motor or a solenoid and multiple movements are timed by a control unit, is also usable.

Although the container 1 turned to the specified direction is carried to the label mounting position E linearly without being rotated in the above embodiment, it may be carried in an arc if only the relationship between the direction of the container 1 determined at the position D and the direction thereof at the position E is kept the same.

In the above embodiment, a pair of carrying members, each having two holding portions and moving integrally, carry the container 1 from the position C to the position D and further from the position D to the position E. However, multiple independent carrying devices may also be used. In the latter case, there is no necessity of uniformizing the distances between the positions C and D, between the positions D and E, and between the holding portions 21a and 21b of each carrying member 21. This diversifies the possibility for designing.

As the carrying device, a handling robot or the like may be used. In this case, even a container comprising no body of rotation may easily be directed.

The direction adjustment of the container 1 may also be done by a handling robot or the like instead of by rotating the driving roller 31a and the free rollers 31b.

The label mounting apparatus of the above embodiment is for mounting the cylindrical label 102 around the container 1 from above. Needless to say, this invention may be used for mounting a small label partially covering the container 1 thereon sideward.

This invention is also used for putting letters or patterns on a container or for processing a specified portion of a container as well as for mounting a label.

Although the container 1 in the above embodiment is cylindrical, other shapes of containers are used if only the holding portions 21a and 21b and the holding members 41 are appropriately shaped.

Although the present invention has been fully described by way of an embodiment with references to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A container transport device for turning a container to a specified direction and transporting the container to a position for specified processing, the device comprising:

first transport means for transporting one of a plurality of supplied containers to a first position, the one being a container leading a rest of the containers, said first transport means comprises taking-out means for transporting the container to a third position and carrying out for transporting the container to a first position, the third position being upstream from the first position in a transporting direction;

detecting means for detecting an orientation direction of the container;

rotating means for turning the container to a specified direction at the first position; and second transport means for transporting the container from the first position to a second position for specified processing so that the container is directed in a certain relationship with the specified direction at the second position, said second transport means comprises a pair of holding members each having a holding portion, the members being movable between the first and the second position repeatedly, the holding portion for holding the container at the first position while the container is transported by the holding members to the second position.

2. A container transport device of claim 1, wherein the taking-out means includes a widening device for widening a distance between the transported container and the rest of the containers.

3. A container transport device of claim 2, wherein the taking-out means comprises a star wheel having at least a concave for transporting one container at a time.

4. A container transport device of claim 1, further comprising positioning means for positioning the container at a fourth position upstream from the first position in the transporting direction, the fourth position being equally distanced from the first position as the second position is from the first position.

5. A container transport device of claim 4, wherein the holding members each have another holding portion for, while the container is held by the holding members, holding another container at the fourth position.

6. A container transport device of claim 5, wherein the holding members are close to each other when moving downstream and are distanced from each other when moving upstream.

7. A container transport device of claim 6, said rotating means is at a retracting position for allowing the container to be transported when the holding members are moving downstream and is at a contacting position for contacting the container to rotate the container when the holding members are moving upstream.

8. A container transport device of claim 6, wherein the positioning means is at another retracting position for allowing the container to be transported when the holding members are moving downstream and is at a stopping position for stopping the container when the holding members are moving upstream 9. A container transport device of claim 1, wherein said rotating means comprises a rotating member for rotating the container until the detecting means detects the container is turned to the specified direction.

10. A container transport device of claim 1, wherein said rotating means comprises another rotating member for rotating the container by a difference between the orientation direction and the specified direction.

11. A container transport device of claim 1, wherein each of said first transport means and said second transport means has a construction in which the container is transported in substantially the same direction as supplied.

12. A container transport device for transporting an unprocessed container having a pattern thereon while temporarily stopping the container at a processing position on a transport path, the pattern being directed as specified at the processing position, the device comprising:

transport means for transporting unprocessed containers;

widening means for widening a distance between one of the containers and rest thereof, the one container being a container leading a rest on a transporting path;

first carrying means movable between first and second position for repeatedly transporting, while holding, the leading container downstream a certain distance in a transporting direction, direction adjusting means for rotating the leading container to turn a mark of a pattern thereon to a specified direction; and second carrying means movable between first and second positions for repeatedly transporting, while holding, the leading container further downstream in the transporting direction to a processing position while maintaining the specified direction of the container.

13. A container transport device of claim 12, wherein said two carrying means are integrated into one having two holding portions respectively provided at an upstream position and a downstream position in the transporting direction, the holding portions transporting while holding two containers by one operation.

* * * * *